US010442009B2

(12) United States Patent
Sergyeyenko et al.

(10) Patent No.: US 10,442,009 B2
(45) Date of Patent: Oct. 15, 2019

(54) DRILL WITH REMOVABLE CHUCK

(71) Applicant: BLACK & DECKER INC., New Britain, CT (US)

(72) Inventors: Oleksiy Sergyeyenko, Baldwin, MD (US); Sean Bailey, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/647,604

(22) Filed: Jul. 12, 2017

(65) Prior Publication Data
US 2018/0214958 A1 Aug. 2, 2018

Related U.S. Application Data

(60) Provisional application No. 62/452,545, filed on Jan. 31, 2017.

(51) Int. Cl.
*B23B 31/10* (2006.01)
*B23B 45/02* (2006.01)
(Continued)

(52) U.S. Cl.
CPC .............. *B23B 45/02* (2013.01); *B23B 31/10* (2013.01); *B23B 45/003* (2013.01);
(Continued)

(58) Field of Classification Search
CPC ....... B23B 45/003; B23B 45/02; B23B 45/00; B23B 2231/38; B25F 3/00;
(Continued)

(56) References Cited

U.S. PATENT DOCUMENTS 3,484,114 A * 12/1969 Rodin ................... B25B 21/007
279/144
3,932,904 A * 1/1976 Nilsson ................. B25B 21/007
279/145
(Continued)

FOREIGN PATENT DOCUMENTS

DE 4106129 A1 * 9/1992 ........... B23B 31/123
DE 20312887 10/2003
(Continued)

OTHER PUBLICATIONS

Description DE102009034964 (Translation) obtained at https://worldwide.espacenet.com/ (last visited Jun. 13, 2018).*
(Continued)

*Primary Examiner* — Ryan C Rufo
(74) *Attorney, Agent, or Firm* — Stephen R. Valancius

(57) ABSTRACT

A power tool including a motor and a rotatable spindle driven by the motor to hold and drive a first bit. There is a recess located on the spindle. The power tool also includes a removable chuck with a lock member and a locking collar. The locking collar includes a locking position in which the locking collar biases the lock member into the recess to retain the chuck on the spindle. The locking collar also includes a release position in which the lock members are able to exit the recess and the chuck is able to be removed from the spindle by a user. The locking collar is axially movable from the locking position to the release position.

15 Claims, 17 Drawing Sheets

(51) Int. Cl.
*B23B 45/00* (2006.01)
*B25B 21/00* (2006.01)
*B23B 51/12* (2006.01)

(52) U.S. Cl.
CPC .............. *B25B 21/007* (2013.01); *B23B 51/12* (2013.01); *B23B 2231/38* (2013.01)

(58) Field of Classification Search
CPC .............. Y10T 408/957; Y10T 408/953; Y10T 408/95; Y10T 279/3406; Y10T 279/3418
See application file for complete search history.

(56) References Cited

U.S. PATENT DOCUMENTS

| | | | |
|---|---|---|---|
| 4,775,269 A | | 10/1988 | Brix |
| 4,824,298 A | * | 4/1989 | Lippacher ............. B23B 31/008 173/48 |
| 5,129,118 A | * | 7/1992 | Walmesley ............... B25F 3/00 279/145 |
| 5,180,261 A | * | 1/1993 | Schreiber ................ B23Q 3/12 279/145 |
| 5,316,323 A | | 5/1994 | Jovanovic |
| 5,342,154 A | * | 8/1994 | Holzer ..................... B23Q 3/12 279/143 |
| 5,951,026 A | | 9/1999 | Harman, Jr. et al. |
| 6,047,971 A | | 4/2000 | Harman, Jr. et al. |
| 6,079,716 A | | 6/2000 | Harman, Jr. et al. |
| 6,293,559 B1 | | 9/2001 | Harman, Jr. et al. |
| 6,536,780 B2 | | 3/2003 | Baumann et al. |
| 6,536,782 B2 | | 3/2003 | Rohm |
| 6,550,786 B2 | | 4/2003 | Gifford et al. |
| 6,551,037 B2 | | 4/2003 | Gifford et al. |
| 6,648,563 B2 | | 11/2003 | Rohm |
| 6,688,611 B2 | | 2/2004 | Gifford et al. |
| 6,719,619 B2 | | 4/2004 | Kuo et al. |
| 6,851,678 B2 | | 2/2005 | Mack |
| 7,086,313 B2 | | 8/2006 | Cantlon |
| 7,331,738 B2 | | 2/2008 | Hofbrucker et al. |
| 9,718,135 B2 | * | 8/2017 | Schenk ............... B23B 31/1238 |
| 2001/0050465 A1 | * | 12/2001 | Gifford ..................... B23Q 3/12 279/71 |
| 2003/0077137 A1 | | 4/2003 | Rohm |
| 2005/0191139 A1 | * | 9/2005 | Hofbrucker ........... B25B 21/007 408/239 A |
| 2006/0186609 A1 | | 8/2006 | Baumann et al. |
| 2007/0290458 A1 | * | 12/2007 | Chuang .................... B25F 3/00 279/143 |
| 2013/0161044 A1 | | 6/2013 | Hecht et al. |
| 2014/0131959 A1 | | 5/2014 | Tussing |
| 2014/0346744 A1 | | 11/2014 | Herr et al. |
| 2015/0090471 A1 | | 4/2015 | Tao |
| 2015/0314375 A1 | | 11/2015 | Schenk |

FOREIGN PATENT DOCUMENTS

| | | | | |
|---|---|---|---|---|
| DE | 102009034964 | | 3/2011 | |
| DE | 102009034964 A1 | * | 3/2011 | ........... B23B 31/123 |
| DE | 102010030433 A1 | * | 12/2011 | ......... B23B 31/1238 |
| DE | 102015200828 A1 | * | 7/2016 | ................ B25F 3/00 |
| EP | 0492729 A1 | * | 7/1992 | .............. B23B 31/22 |
| EP | 2383076 A2 | * | 11/2011 | ................ B25F 3/00 |
| EP | 3085479 A1 | * | 10/2016 | ......... B23B 31/1071 |
| GB | 2430907 A | * | 4/2007 | ........... B23B 45/003 |

OTHER PUBLICATIONS

Description DE4106129 obtained at https://worldwide.espacenet.com/ (last visited Oct. 16, 2018).*
AEG BSB 18 CBL Brushless Hammerdrill Driver—First Impressions shown on "You Tube", published Feb. 23, 2017 https://www.youtube.com/watch?v=I-wCQMHZNrY.
Prior Art, Black & Decker FireStorm Drill FSD122 photographs.
Prior Art, Black & Decker FireStorm Drill FSD122 Instruction Manual.
Prior Art, Black & Decker FireStorm Drill FSD122 Parts List.

* cited by examiner

DRILL WITH REMOVABLE CHUCK

CROSS-REFERENCE TO RELATED APPLICATION

This application claims the benefit of U.S. Provisional Application No. 62/452,545 filed on Jan. 31, 2017, entitled Drill With Removable Chuck. The entire contents of U.S. Provisional Application No. 62/452,545 are incorporated herein by reference.

FIELD OF THE INVENTION

The present invention relates to power tools, particularly a drill with a removable chuck. The drill may be used in a first mode when the chuck is detached and a second mode when the chuck is attached.

BACKGROUND

There are various existing drills. It is desired to provide a drill with a removable chuck which can be removed and which can efficiently switch between operation with and without the chuck.

SUMMARY

According to an aspect of an exemplary embodiment, there is a power tool includes a moto, a rotatable spindle driven by the motor and configured to hold and drive a first bit and a recess located on the spindle. It also includes a removable chuck, the removable chuck including a lock member and a locking collar. The locking collar includes a locking position in which the locking collar biases the lock member into the recess to retain the chuck on the spindle. The locking collar includes a release position in which the lock members are able to exit the recess and the chuck is able to be removed from the spindle by a user. The locking collar is axially movable from the locking position to the release position.

The locking collar may be biased towards the locking position.

The locking collar may move in a direction away from the motor when moving from the locking position to the release position.

The power tool may further include a bit receiving opening in which the first bit held by the spindle is received when the chuck is retained on the spindle.

The chuck may further include a plurality of jaws configured to hold and drive a second bit.

The removable chuck may include a connection shaft which holds the lock members.

The lock members may be ball bearings.

The locking collar may include a plurality of ball bearing interlock projections which project radially inwardly and keep the lock members in the groove when the locking collar is in the locked position.

The power tool may an axial length along a rotational axis of the motor and the axial length may be less than 25 mm.

According to another aspect, there is an exemplary embodiment of a power tool that includes a motor, a rotatable spindle driven by the motor and configured to hold and drive a first bit and a removable chuck configured to hold and drive a second bit and including a locking mechanism having a locking position in which the removable chuck is locked to the spindle and a release position in which the removable chuck can be removed from the spindle. The power tool is operable to in a first mode in which the removable chuck is removed from the and the first bit is exposed. The power tool is operable in a second mode in which the removable chuck is locked to the spindle and the first bit is covered by the removable chuck. Also, the power tool is configured to switch between the first mode and the second mode without removal of the first bit from the spindle.

The locking mechanism may include an actuation member which is configured to move the locking mechanism from the locking position to the release position.

The actuation member may be movable in an axial direction.

The actuation member may be movable in an axial direction along an axis of the chuck.

In the second mode, the actuation member may move away from the motor to move the locking mechanism from the locking position to the release position.

The locking mechanism may include a shaft with a central opening.

The spindle may fit into the central opening.

The actuation member may be ring shaped.

According to another aspect, there is an exemplary embodiment of a power tool which includes a motor, a rotatable spindle driven by the motor and configured to hold and drive a first bit, a recess located on the spindle and a removable chuck, the removable chuck including a lock member and a locking collar. The locking collar includes a locking position in which the locking collar biases the lock member into the recess to retain the chuck on the spindle. The locking collar also includes a release position in which the lock members are able to exit the recess and the chuck is able to be removed from the spindle by a user. The locking collar moves axially away from the motor to move from the locking position to the release position. The locking collar is biased towards the locking position.

The power tool may further include a bit receiving opening in which the first bit held by the spindle is received when the chuck is retained on the spindle.

The chuck may further include a plurality of jaws configured to hold and drive a second bit.

The removable chuck may include a connection shaft which holds the lock members.

The locking collar may include a plurality interlock projections which project radially inwardly and keep the lock members in the groove when the locking collar is in the locked position.

The power tool may also include a storage feature for the chuck.

The power tool may also include a storage bit holder.

The storage feature for the chuck may include an attachment bar and a chuck holder.

The attachment bar may be configured to fit in and be held by the storage bit holder.

The storage feature may include a hinge connecting the attachment bar and the chuck holder so that the chuck holder may be rotated with respect to the attachment bar.

The chuck holder may be rotatable to a position over a foot of the power tool and the attachment bar when not holding the chuck and to a position away from and adjacent to the foot and the attachment bar when in a holding position for holding the chuck when the chuck is not in use.

DETAILED DESCRIPTION OF EXEMPLARY EMBODIMENTS

Figure 1:
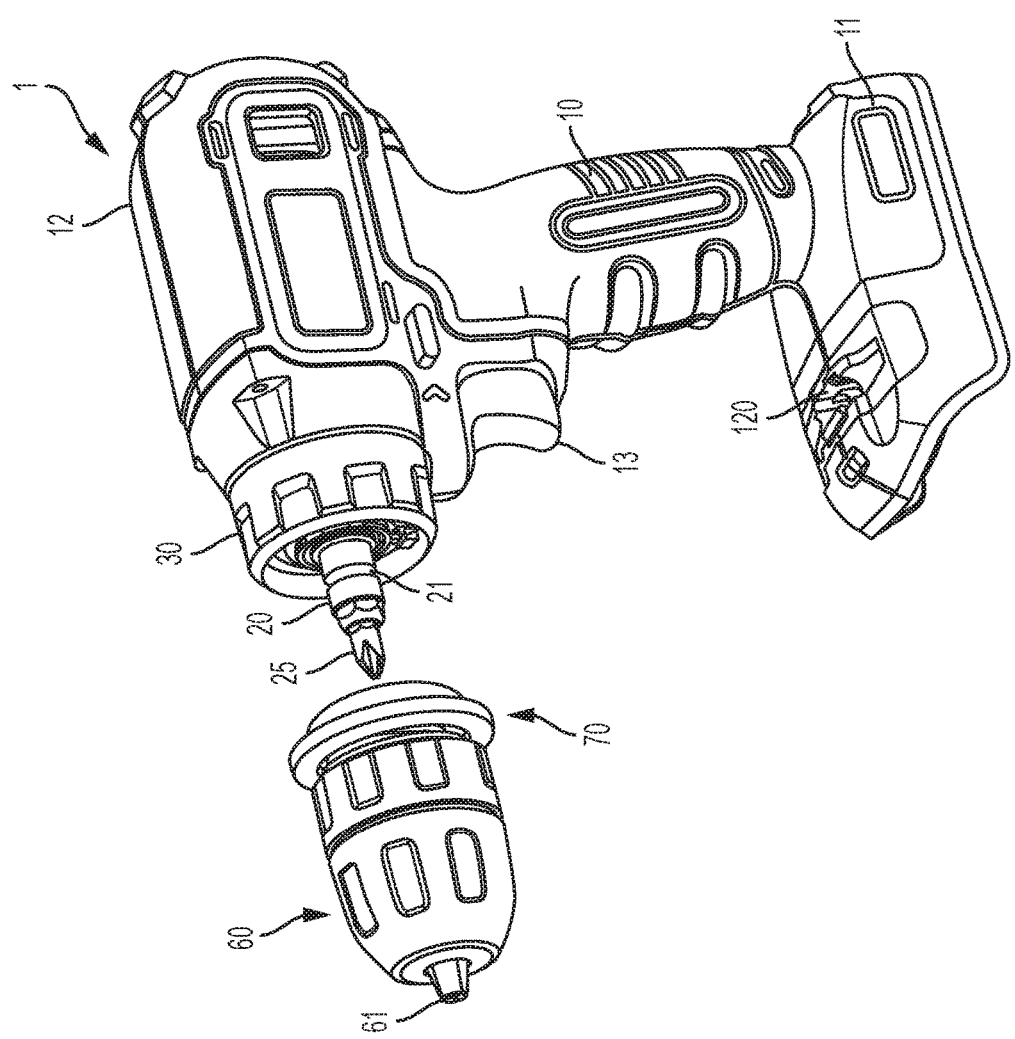
FIG. 1 is a perspective view of a drill with a removable chuck according to an exemplary embodiment.

A user may want to quickly switch between two bits to accomplish a task quickly. For example, a user may wish to use a drill bit and quickly switch to a screwdriver bit.

An exemplary embodiment of the present application shown in FIGS. 1-18 discloses a drill 1 with a removable chuck 60 that can be coupled to the drill 1 or removed from the drill 1. As shown in, for example, FIGS. 3 and 5, the chuck 60 can be attached so that it is driven by the drill and its jaws 61 can hold a bit. At other times, the chuck 60 is removed so that output spindle 20 is exposed. Output spindle 20 holds a first bit 25 and is driven by the motor of the drill 1. In this case, the first bit 25 is a hexagonal screwdriver bit. When the chuck 60 is removed, the first bit 25 driven by the output spindle 20 can be used to perform a screwdriving operation. In this case, the first bit 25 is standard ¼" hexagonal screwdriver bit. The hexagonal screwdriver bit 25 of the exemplary embodiment is approximately 2" in length. In other exemplary embodiments, the spindle 20 and other part of the drill 1 could be configured to accommodate bits of different sizes, such as a ⅜" hexagonal bit.

As shown in FIGS. 1-5, the drill includes a handle 10 which can be gripped by a user. A foot 11 is at one end of the handle 10 and is configured to receive a battery pack which powers the drill 1. At the other end of the handle is a motor housing 12 in which a motor 90 (FIG. 18) is housed. The motor 90 drives an output spindle 20 which holds a first bit 25. The spindle 20 includes a groove 21, which will be described later in further detail. The drill 1 of the exemplary embodiment also includes a clutch 30.

Drill 1 also includes a removable chuck 60. The removable chuck 60 includes a plurality of jaws 61 for securing a bit. The chuck 60 also includes a locking ring 70. The locking ring 70 helps secure the chuck 60 to the output spindle 20. Additionally, the locking ring 70 can be moved by the user to unlock the chuck 60 from the output spindle 20 so that the chuck 60 can be removed from the remainder of the drill 1.

Figure 15:
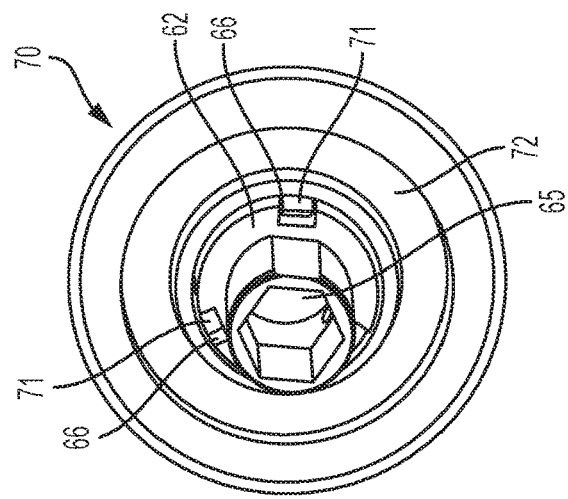
FIG. 15 is another perspective view of the a locking ring and connection section of the exemplary embodiment.
Figure 16:
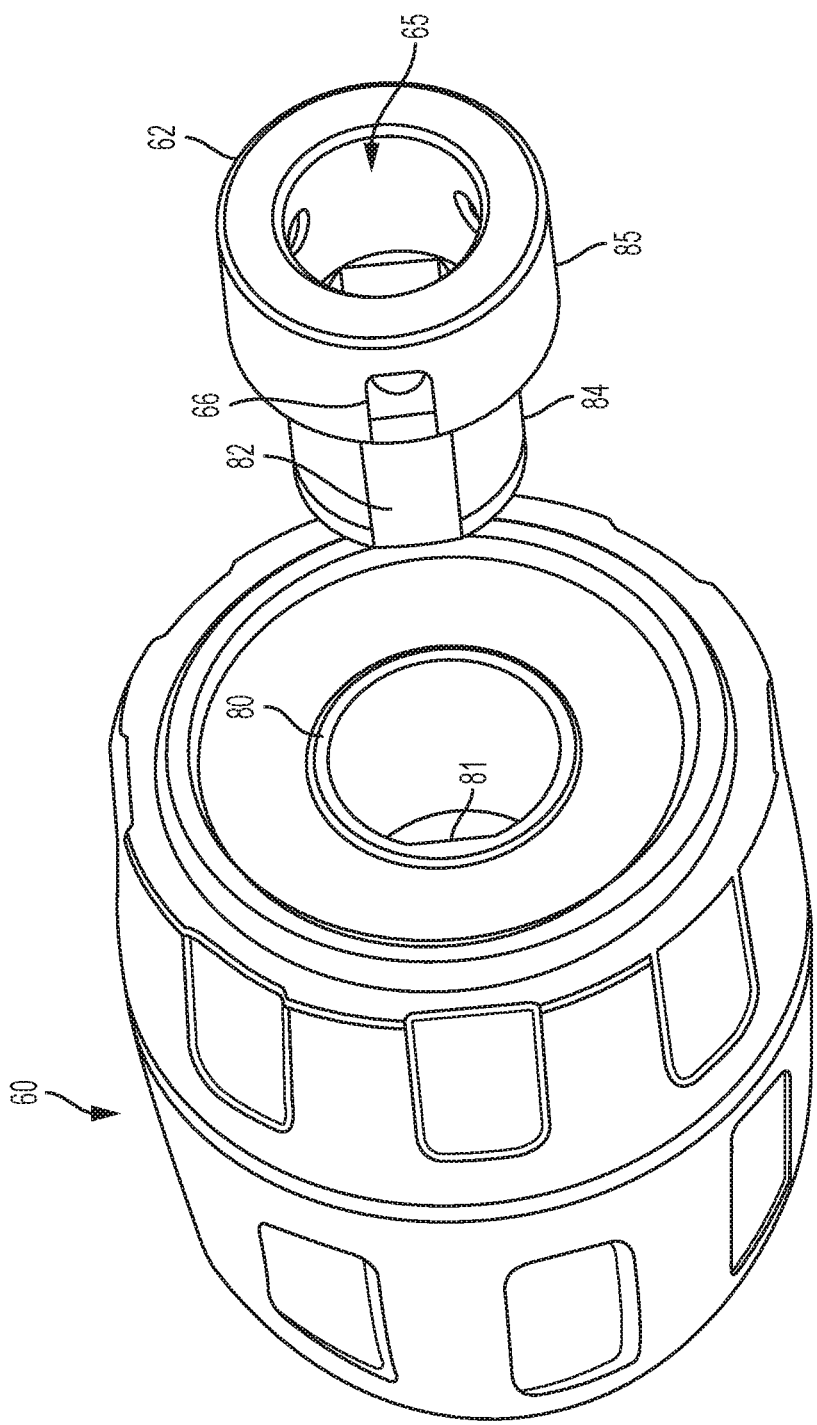
FIG. 16 is an exploded perspective view of the exemplary embodiment of the chuck and connection section.
Figure 17:
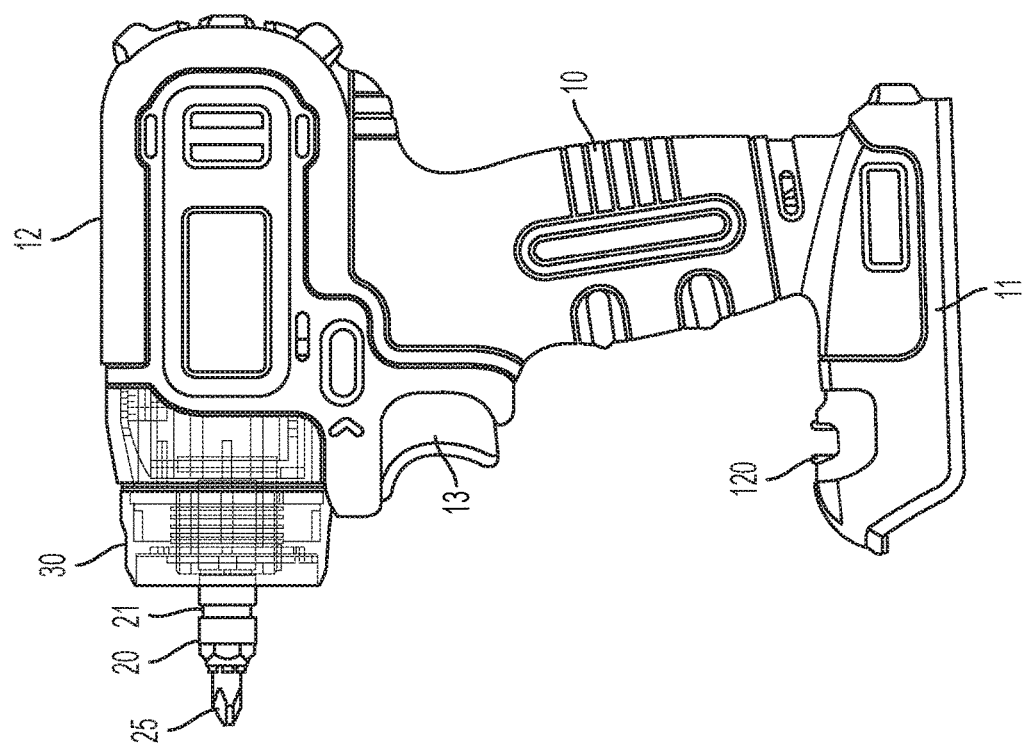
FIG. 17 is a side view of the exemplary embodiment of the drill with the chuck removed and a forward portion shown in shadow.
Figure 18:
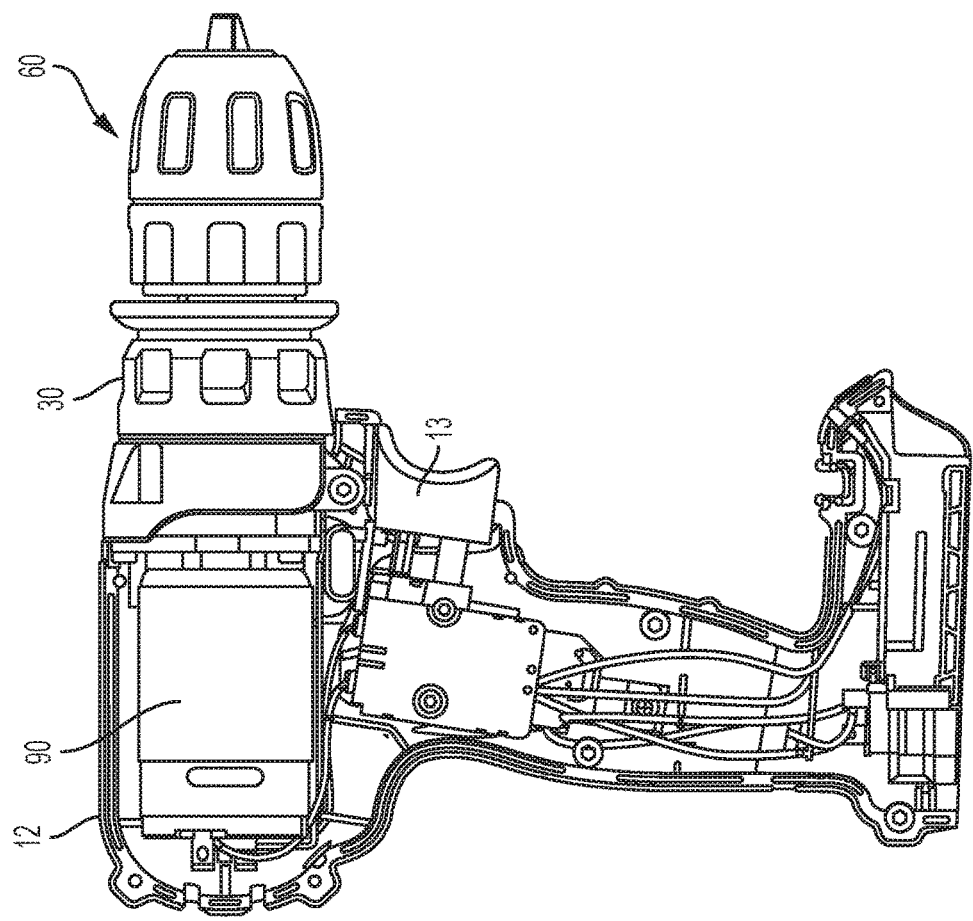
FIG. 18 is a side view of the exemplary embodiment of the drill with one half of the housing removed to show internal features.

Further details of the chuck 60 and locking ring 70 are shown in FIGS. 7-17. With reference to FIG. 16, the chuck 60 includes a chuck body opening 80. The chuck body opening 80 is generally cylindrical, but includes a flat portion 81 on one side. A connection shaft 62 is shaped to fit into the chuck body opening 80. The connection shaft 62 has a first portion 84 and a second portion 85. The first portion 84 has a smaller outer diameter than the second portion 85 and is sized and shaped to fit into the chuck body opening 80. Particularly, the first portion 84 has a generally cylindrical outer shape. It also has one flat side 82 which corresponds to the flat portion 81 of the chuck body opening 80. The first portion 84 can be sized so that it provides a secure press fit with the chuck body opening 80. The connection shaft 62 can also be connected to the chuck body opening 80 in other ways, such as, not limited to, via adhesive.

Figure 14:
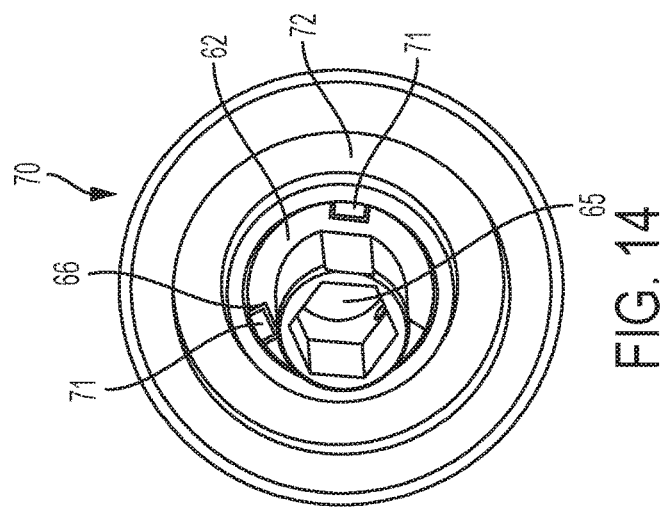
FIG. 14 is another perspective view of the a locking ring and connection section of the exemplary embodiment.
Figure 13:
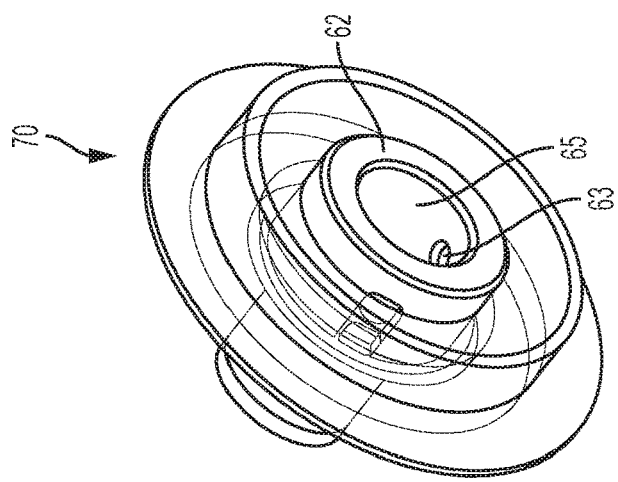
FIG. 13 is a perspective view of the a locking ring and connection section of the exemplary embodiment.

The second portion 85 of the connection shaft 62 does not fit into the chuck body opening 80. Instead, it engages the locking ring 70, as shown in FIGS. 13-15. As shown in FIGS. 13-16, the second portion 85 also includes a substantially cylindrical outer surface. It also includes a substantially cylindrical inner surface. A connection shaft opening 65 is formed through both portions of the connection shaft 62. It has a substantially cylindrical shape in the second portion 85 and a hexagonal interior shape in the first portion 84. This could be changed in different embodiments such that, for example, the inner surface of the connection shaft 62 was hexagonal or substantially circular throughout.

As shown in FIGS. 14-16, the second portion includes three receiving grooves 66. There is a ball bearing 63 at an end of each of the three receiving grooves 66. As shown in FIGS. 13-15, the locking ring 70 includes a body portion 72 and three locking projections 71. The locking projections 71 engage and slide in the grooves 66. In a rearward position, the locking projections 71 are axially aligned with the ball bearings 63 and prevent the ball bearings 63 from radial outward movement. This interaction between the locking projections and the ball bearings 63 is shown, for example, in FIG. 10. As shown there, the locking projections 71 limit radial outward movement of the ball bearings 63. The locking ring 70 is shown in a rearward position in FIG. 15 and in a forward position in FIGS. 13 and 14.

When the locking ring 70 slides forward, the locking projections 71 move forward in the grooves 66 and are no longer aligned with the ball bearings 63. Accordingly, the ball bearings 63 may move radially outwardly to some degree.

Figure 7:
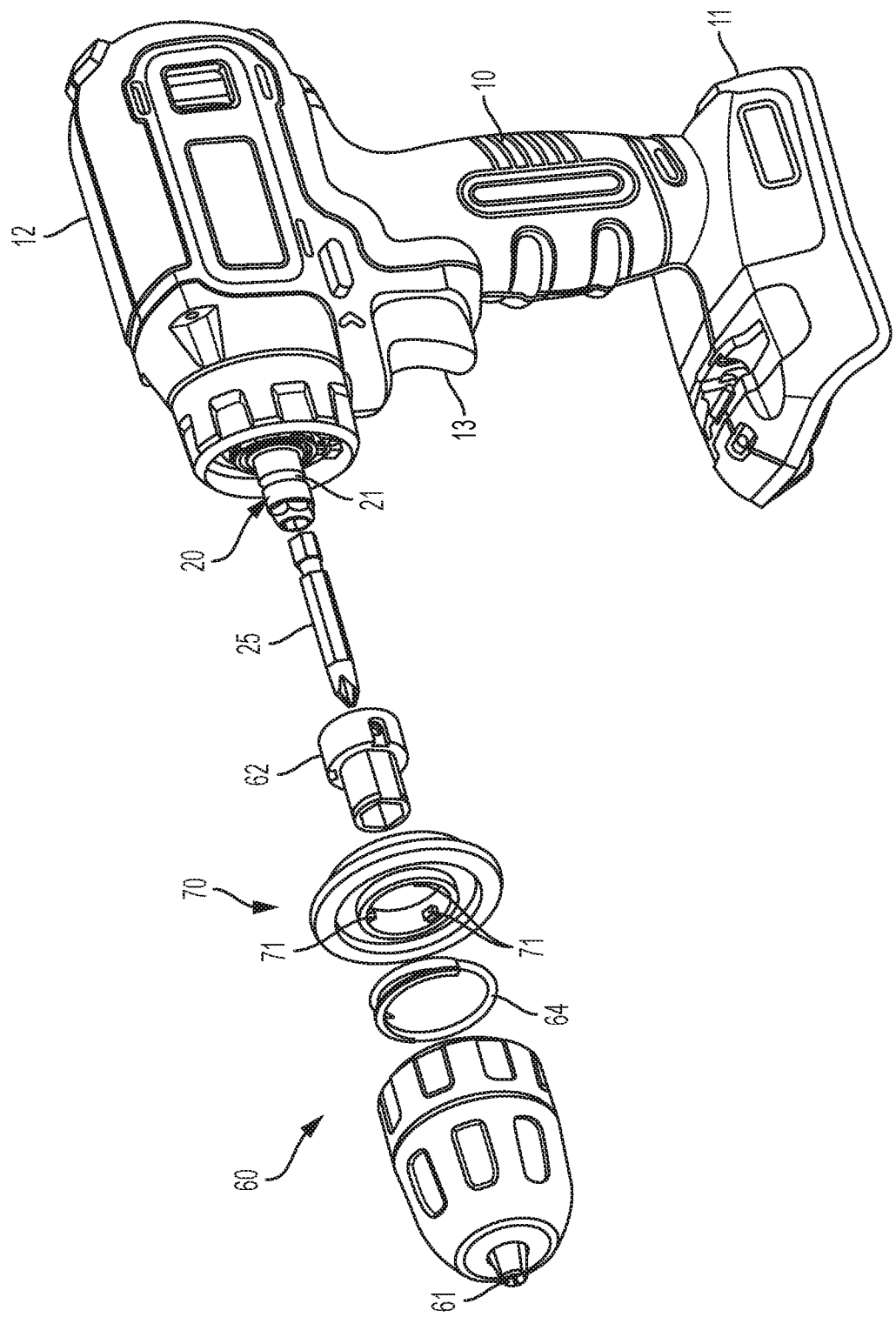
FIG. 7 is an exploded perspective view of the drill of the exemplary embodiment.
Figure 8:
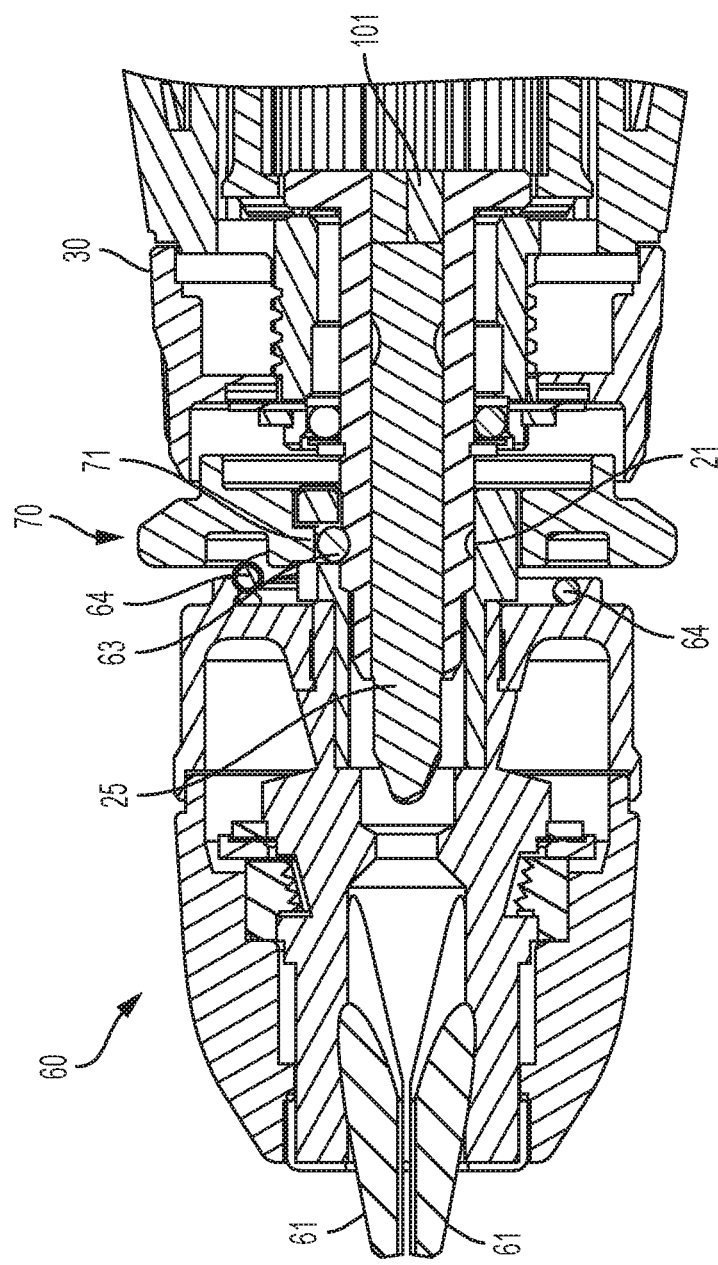
FIG. 8 is a cross-sectional view of a chuck and clutch section of the drill of the exemplary embodiment.
Figure 9:
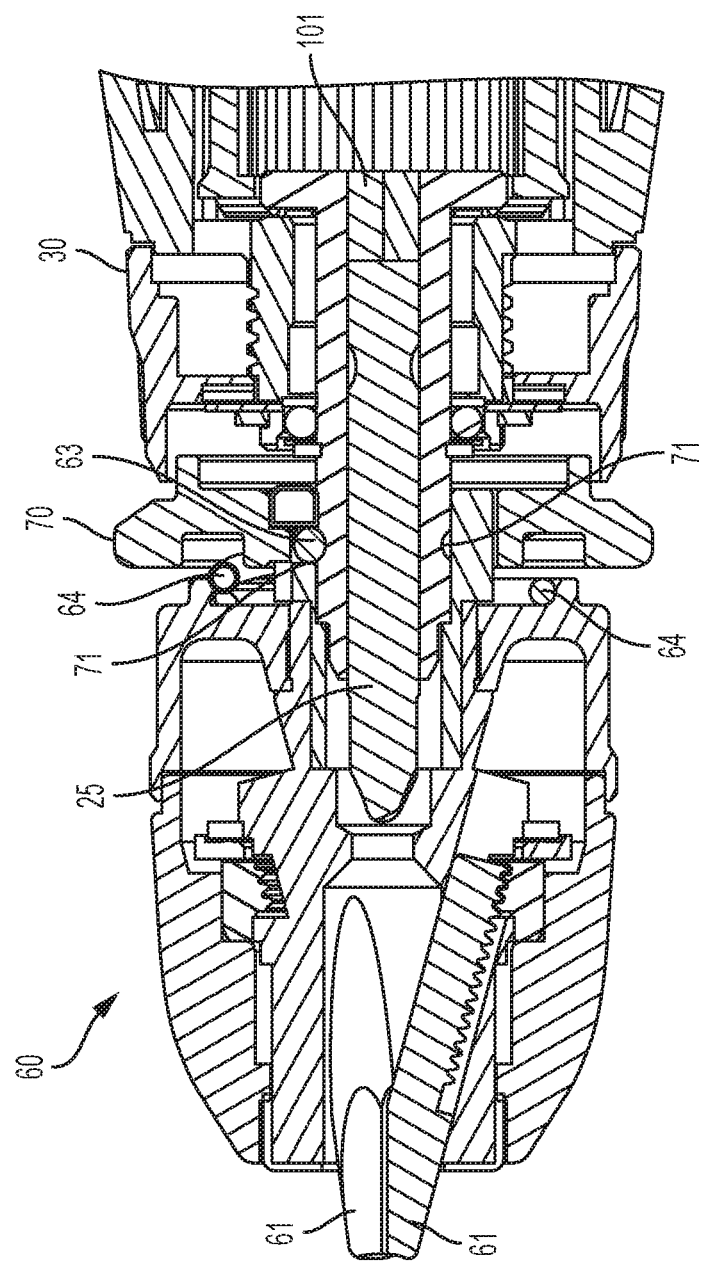
FIG. 9 is a cross-sectional view of a chuck and clutch section of the drill of the exemplary embodiment.
Figure 10:
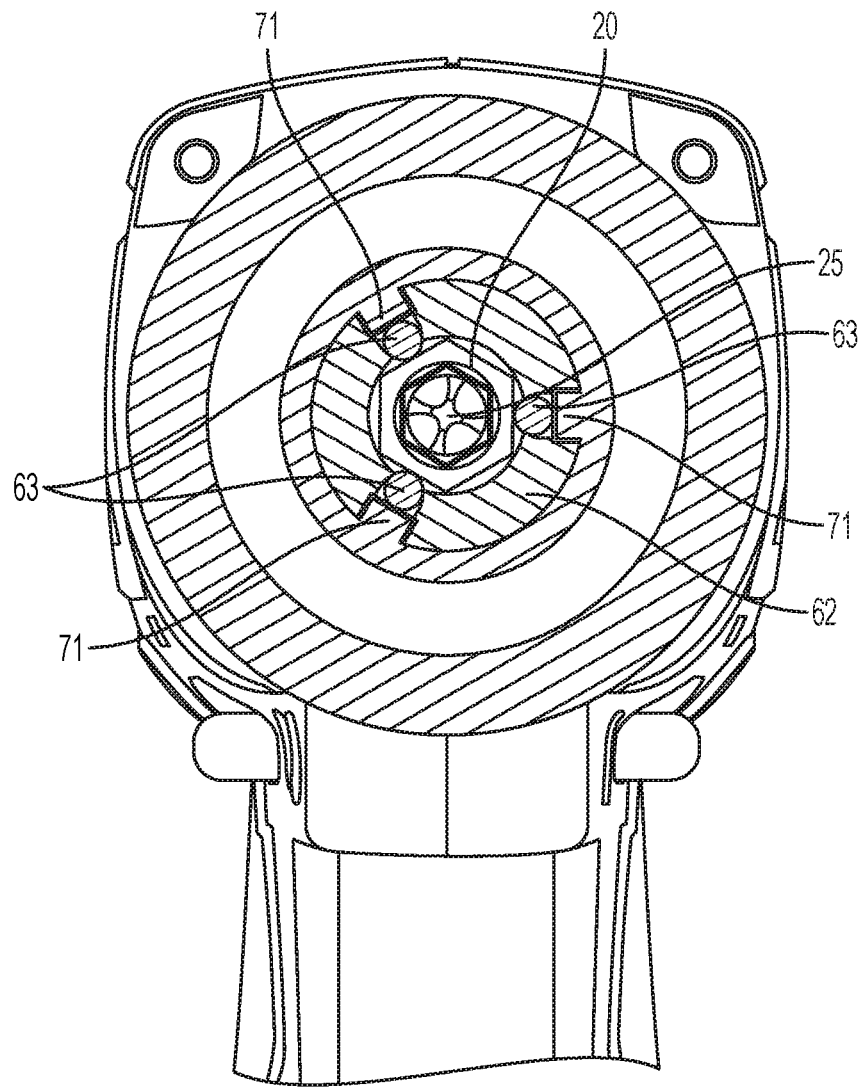
FIG. 10 is a front cross-sectional view of a section of the drill of the exemplary embodiment.
Figure 12:
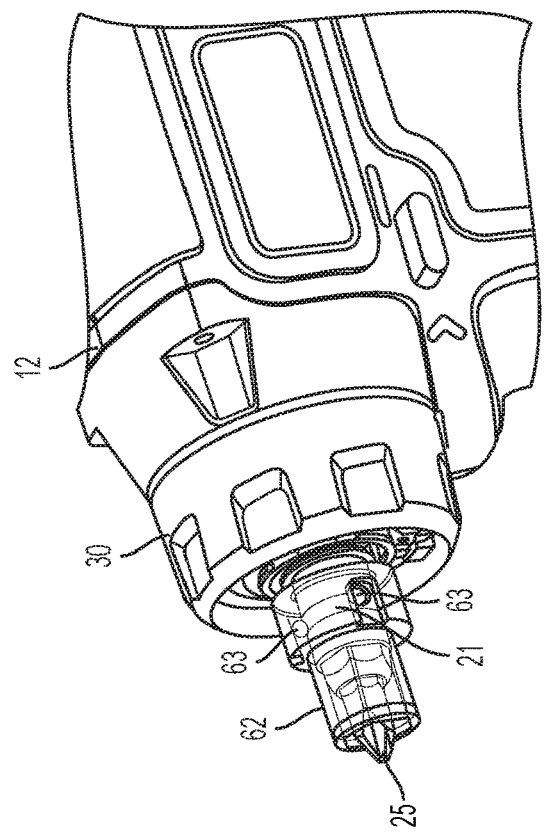
FIG. 12 is a view of a front of the drill with a connection section and ball bearings engaged with a groove on the output spindle.
Figure 11:
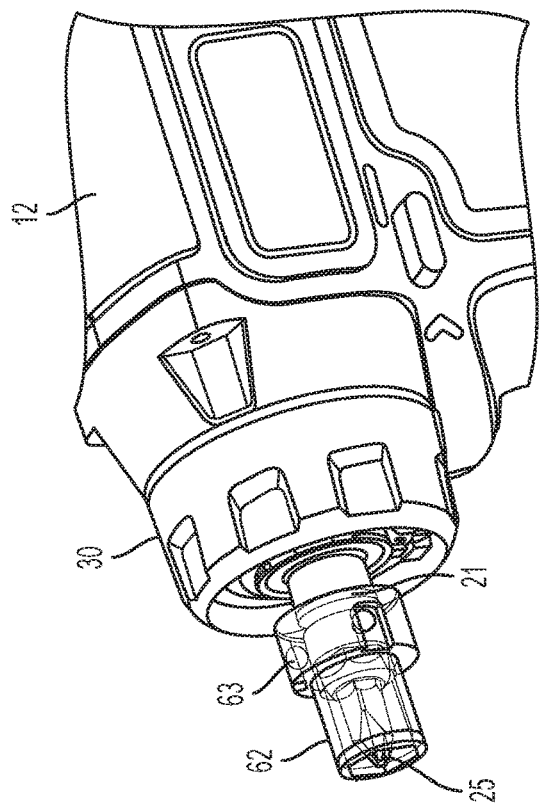
FIG. 11 is a view of a front of the drill with a connection section and ball bearings removed from a groove on the output spindle.

FIGS. 8-12, for example, illustrate the overall operation of the chuck 60 being held to the output spindle 20. As shown in FIG. 7, the chuck 60 includes a compression spring 64. The compression spring 64 biases the locking ring 70 rearwardly towards the output spindle 20. Accordingly, when a user does not act upon the chuck, the locking ring 70 is in a reward position. As shown in FIGS. 8 and 9, when the locking ring 70 is in the rearward position and the chuck 60 is attached to the output spindle 20, locking projection 71 are axially aligned with ball bearings 63. In turn, the ball bearings 63 are aligned with the groove 21. Since the ball bearings 63 are held in the groove 21, the chuck 60 cannot be moved forward off of the output spindle 20. Particularly, the ball bearings 63 are captured in the groove 21. The ball bearings 63 are part of the connection shaft 62. Since the ball bearings 63 are captured in the groove 21, the chuck 60 cannot be removed. FIG. 12 also shows this captured state of the ball bearings 63 in groove 21. As shown in FIGS. 8-10, the locking projections 71 prevent the outward movement of the ball bearings 63.

A user may remove the chuck 60 from the output spindle 20 by pulling forward on the locking ring 70. The locking ring 70 will move forward against the biasing of the compression spring 64 to a forward position. When the locking ring 70 is in a forward position, the locking projections 71 are no longer aligned with the ball bearings. The forward position of the locking ring 70 with respect to the connection shaft 62 is shown in FIGS. 13 and 14. When the locking ring 70 is in the forward position, the ball bearings 63 are no longer prevented from moving radially outwardly. Accordingly, if a user pulls the chuck 60 in a direction away from the output spindle 20, the ball bearings will slide out of the groove 21 and the chuck 60 can be removed.

A user may recouple the chuck 60 to the output spindle 20 by sliding it back onto the spindle 20. The ball bearings 63 will seat in the groove 21 and will be locked when the locking ring 70 is in its rearward position to which it is biased by the compression spring 64. The user may or may not hold the locking ring 70 in the forward/unlocked position when coupling it to the spindle 20. The locking ring 70 will have to be in the forward/unlocked position in order for the ball bearings 63 to slide onto the spindle 20 into the grooves. However, if the locking ring 70 starts in the rearward/locked position, it will be pressed forward by the action of sliding the chuck 60 onto the spindle 20 and will snap back once the ball bearings 63 sit into the groove 21.

Figure 2:
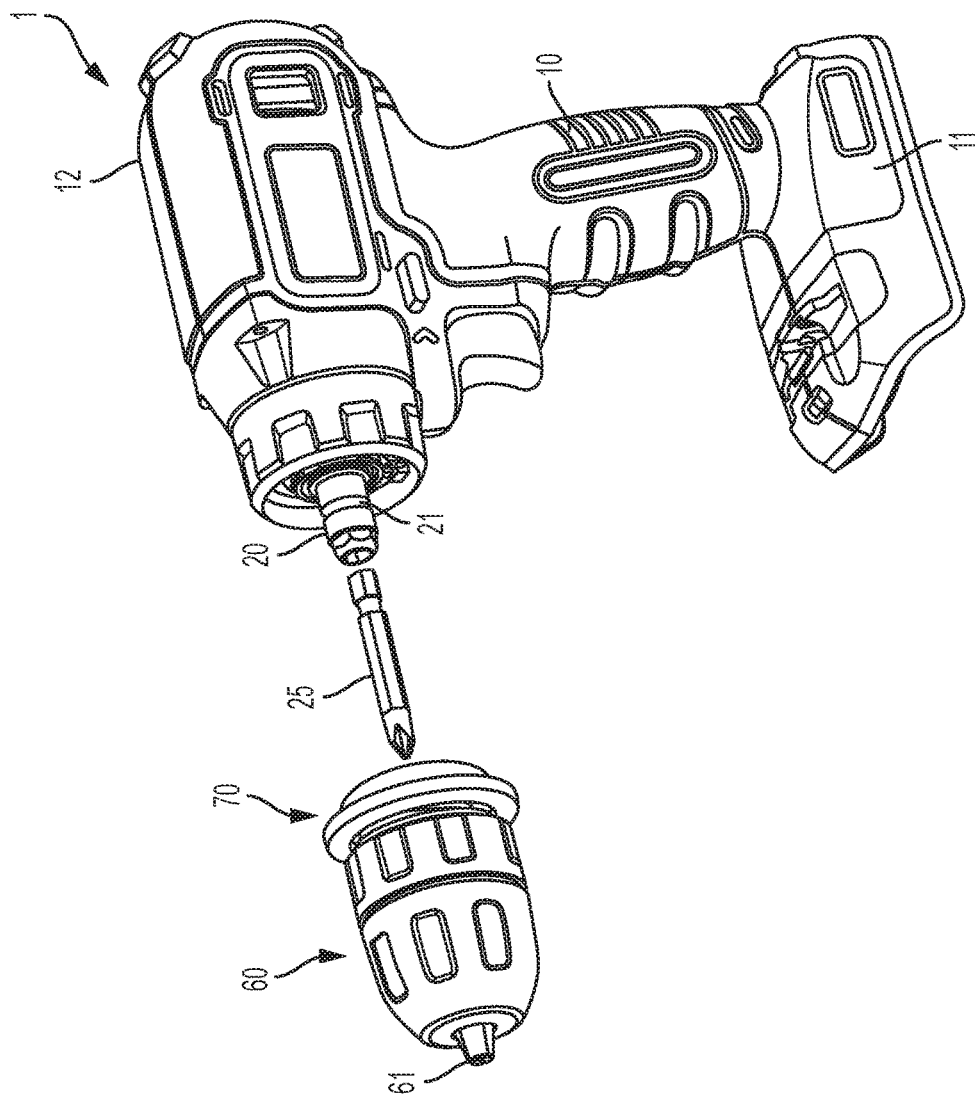
FIG. 2 is another perspective view of the drill of the exemplary embodiment.
Figure 3:
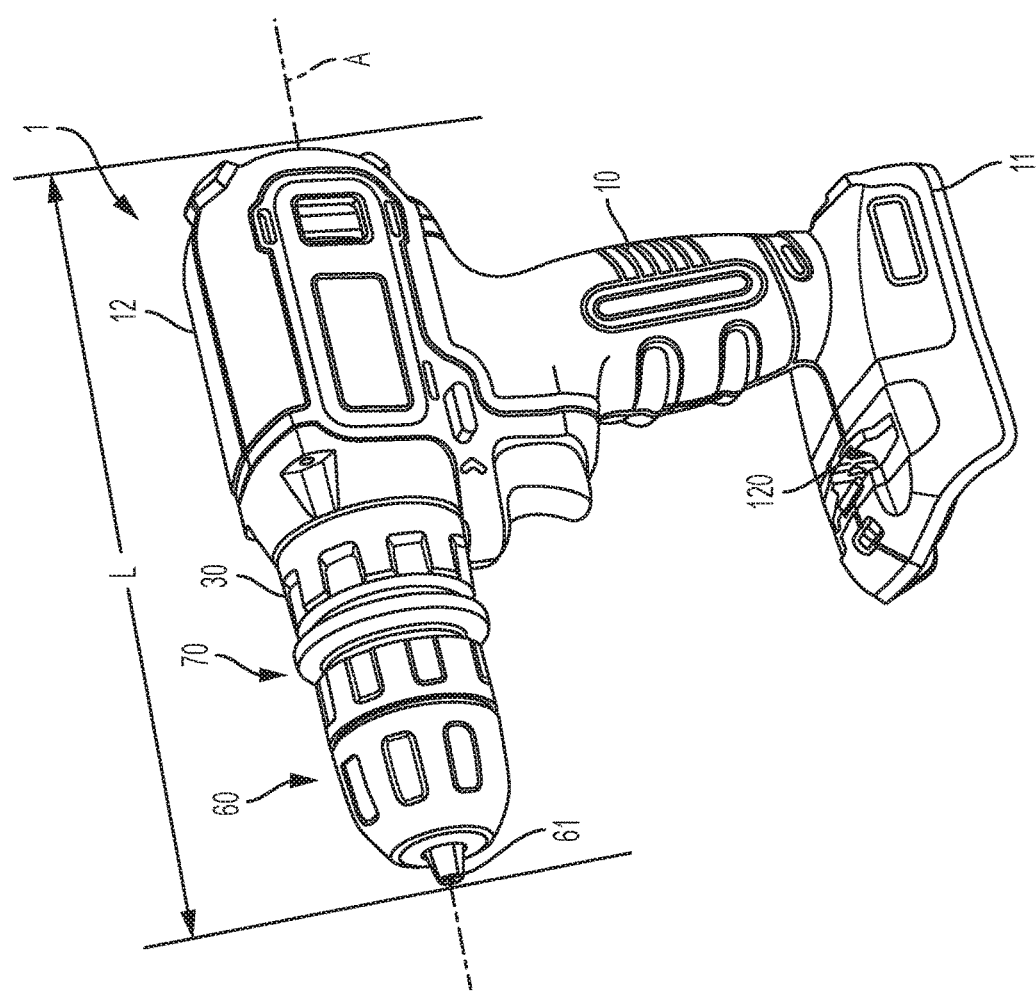
FIG. 3 is another perspective view of the drill of the exemplary embodiment.
Figure 4:
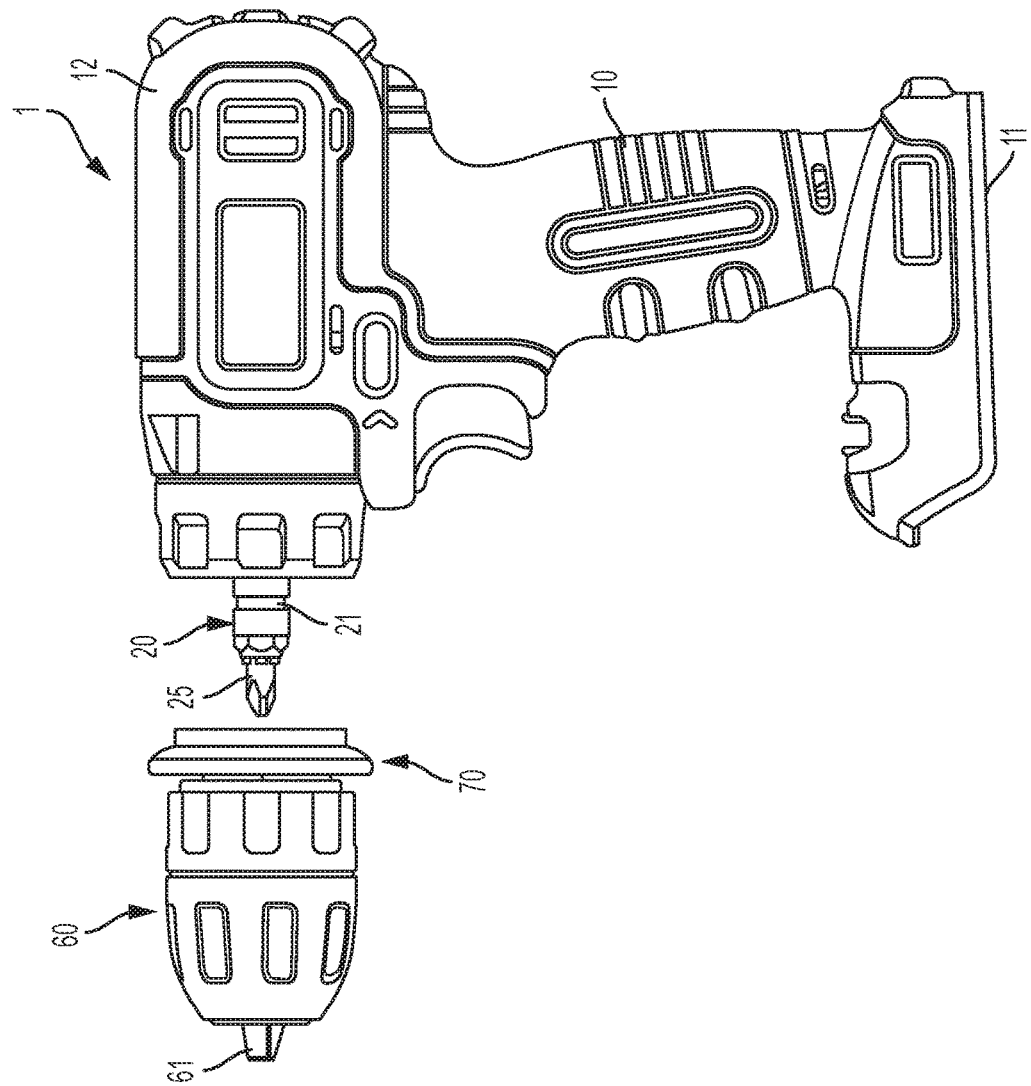
FIG. 4 is a side view of the drill of the exemplary embodiment.
Figure 5:
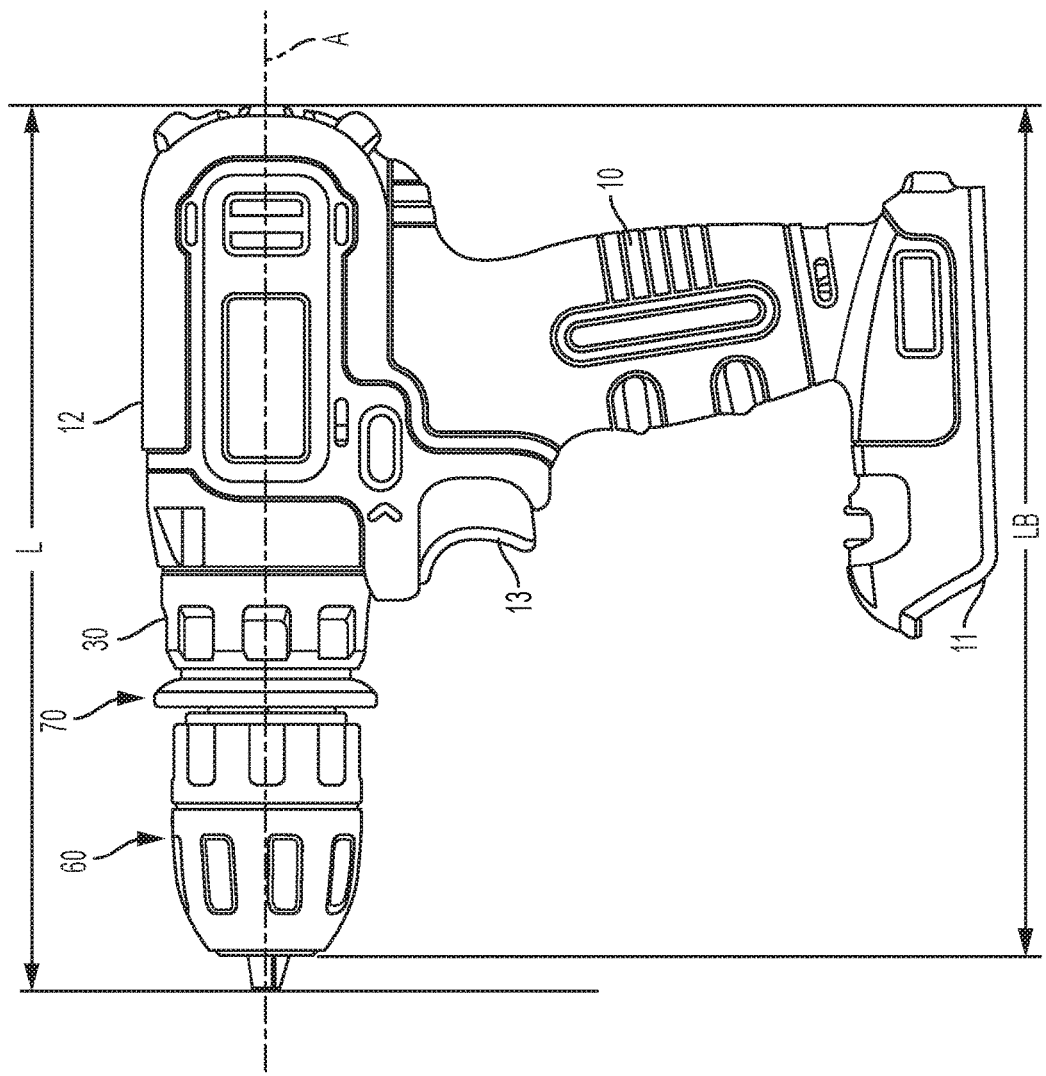
FIG. 5 is another side view of the drill of the exemplary embodiment.
Figure 6:
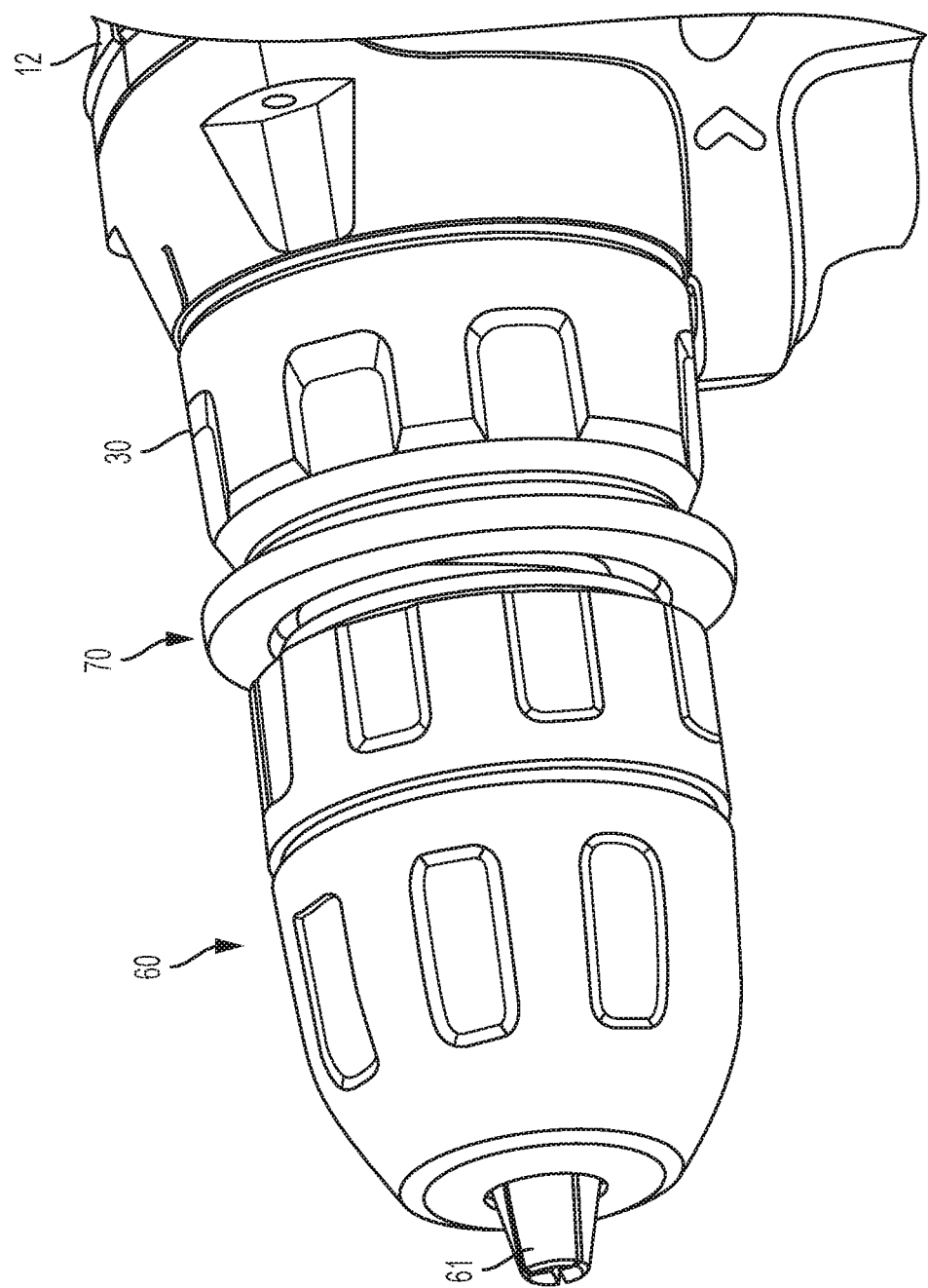
FIG. 6 is a perspective view of a chuck and clutch section of the drill of the exemplary embodiment.

The configuration of the exemplary embodiment provides a quick and efficient change between the uncoupled chuck 60 mode (FIG. 1) and the coupled chuck 60 mode (FIG. 2). For example, in order to remove the chuck 60 from the output spindle 20, the user pulls the locking ring 70 in the same direction as is necessary to remove the chuck 60. Accordingly, the user only needs to pull the locking ring 70 in one direction, axially away from the output spindle 20 and motor 90. Additionally, the exemplary embodiment provides for a compact design. With reference to FIG. 5, the drill 1 has a length L along a rotational axis of the motor 90 and spindle 20 (the motor 90 and spindle 20 share a rotational axis). The length L is measured from the rear of the motor housing 12 to the front of the jaws 61 in a fully retracted position with the chuck 60 attached. The exemplary embodiment may have a length L of 25 mm or less; 23 mm or less; 21 mm or less or 20 mm or less. In this way, the exemplary embodiment provides a removable chuck drill 1 that has a compact size even when the chuck 60 is attached. FIG. 5 also shows a length LB. The length LB is measured from the rear of the motor housing 12 to the front of the chuck 60 body, rather than including the chuck 60 jaws 61. The exemplary embodiment may have a length LB of 25 mm or less; 23 mm or less; 21 mm or less or 20 mm or less.

Figure 19:
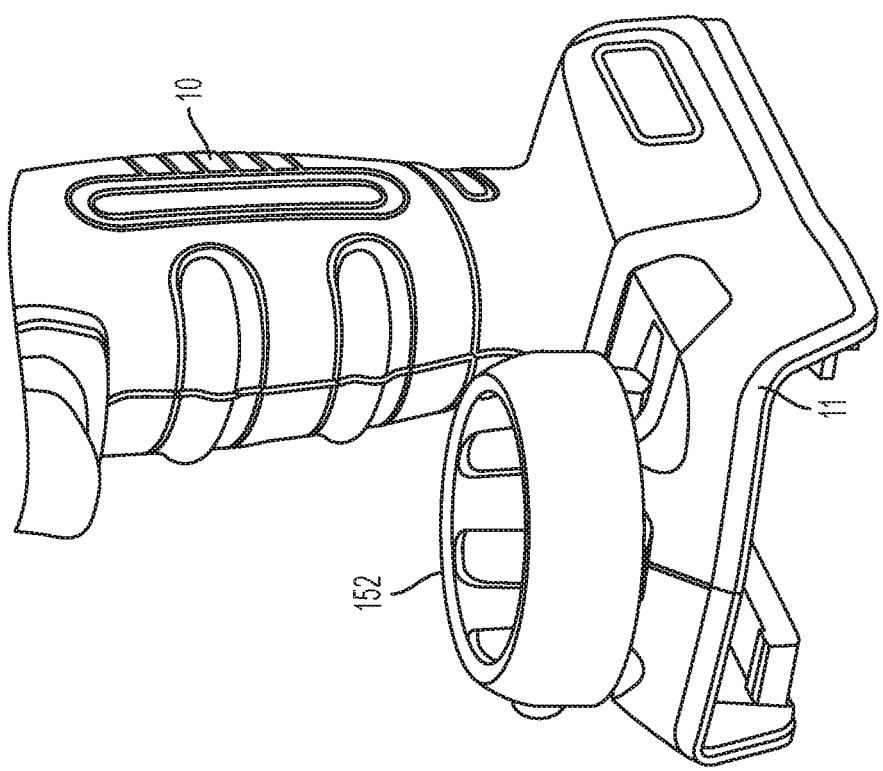
FIG. 19 is a perspective view of a chuck storage attachment.
Figure 20:
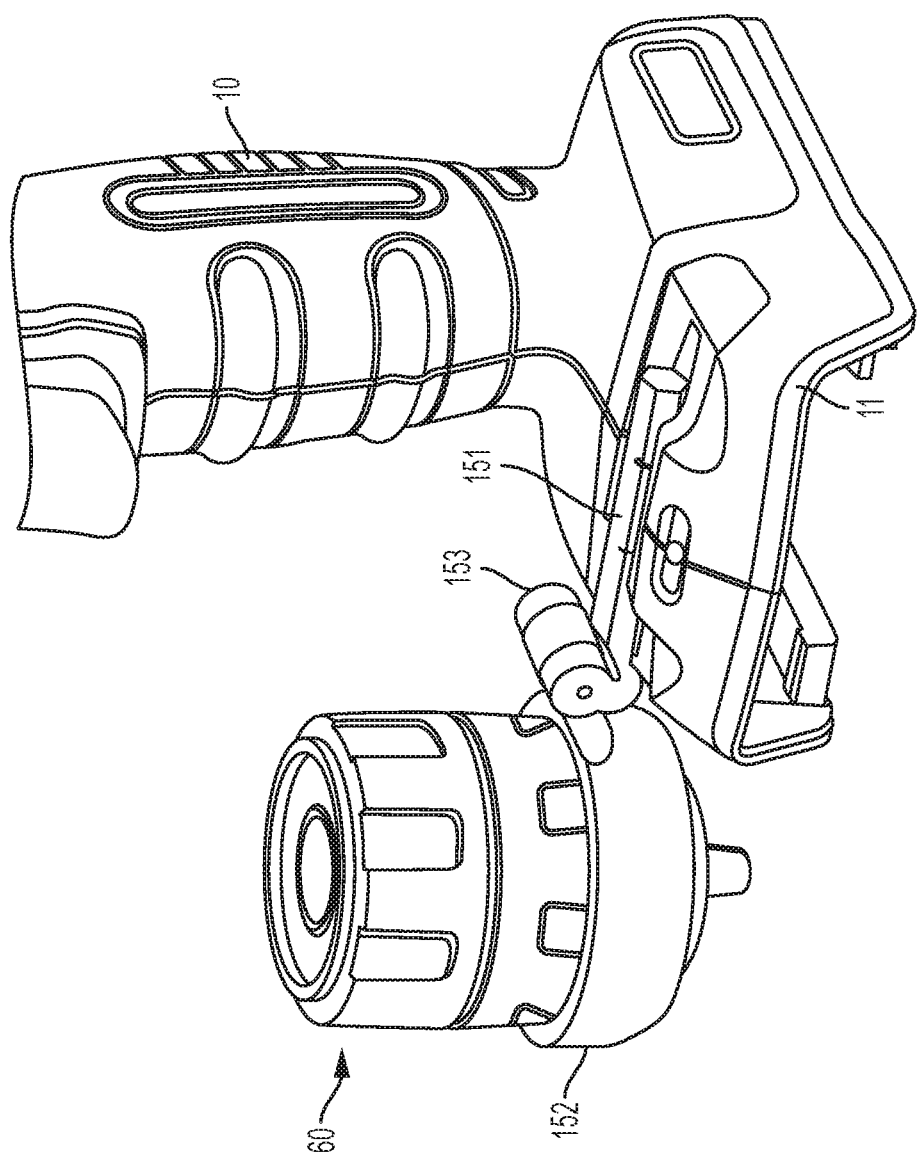
FIG. 20 is a perspective view of the chuck storage attachment with the chuck stored in the chuck storage attachment.

FIGS. 19 and 20 illustrate a storage feature for the chuck 60. The storage feature includes an attachment bar 151 and a holder 152. The attachment bar 151 includes a hexagonal shape so that it can fit and be held in a bit holder 120. In this case the bit holder 120 is a conventional clip style bit holder and is illustrated throughout the drawings. The attachment bar 151 is connected to a holder 152 by a hinge 153. The holder is shaped to receive a front end of the chuck 60. Accordingly, as shown in FIG. 20, the holder 152 can hold the chuck 60 when the chuck 60 is not in use. Additionally, the holder 152 can move positions between the position shown in FIG. 19 and the position shown in FIG. 20. When the holder 152 is not needed, it can be rotated to a position above the foot of the tool 11 and the attachment bar 151 so that it is not in the way of the user. When the holder 152 is needed for use, a user can rotated the holder 152 about the hinge 153 so that it is in a position where the holder 152 can hold the chuck 60.

While the invention has been described by way of exemplary embodiments, it is understood that the words which have been used herein are words of description, rather than words of limitation. Changes may be made within the purview of the appended claims, without departing from the scope and spirit of the invention in its broader aspects.

What is claimed is:

1. A power tool, comprising:
a motor;
a rotatable spindle driven by the motor, the rotatable spindle including a recess;
a screwdriver bit held in the rotatable spindle; and
a removable chuck secured to the rotatable spindle;
wherein the removable chuck includes a locking collar and a connection shaft;
wherein the connection shaft includes at least one groove;
wherein the locking collar includes at least one projection;
wherein the locking collar is biased towards a locked position in which the removable chuck is locked to the rotatable spindle;
wherein the at least one projection is engaged with the at least one groove when the locking collar is in the locked position;
wherein the locking collar is axially movable from the locked position to a release position in which the removable chuck is configured to be released from the rotatable spindle;
wherein the removable chuck includes a chuck body with a chuck body opening;
wherein the chuck body opening is generally cylindrical with a flat portion;
wherein the connection shaft includes a fitting portion which has a generally cylindrical outer surface with a flat surface so as to correspond with the chuck body opening;
wherein the fitting portion is fit in the chuck body opening;
wherein the flat surface extends longitudinally on the cylindrical outer surface;
wherein the removable chuck further includes a lock member; and
wherein the lock member is held in the recess by the at least one projection when the locking collar is in the locked position.

2. The power tool of claim 1, wherein the locking collar moves in a direction away from the motor when moving from the locking position to the release position.

3. The power tool of claim 1, wherein the removable chuck further comprises a bit receiving opening; and
wherein a forward end of the screwdriver bit is disposed in the bit receiving opening.

4. The power tool of claim 1, wherein the removable chuck further includes a plurality of jaws configured to hold and drive a second bit.

5. The power tool of claim 1, wherein the at least one projection of the locking collar is a plurality of interlock projections which project radially inwardly.

6. The power tool of claim 1, wherein the lock member comprises a ball bearing.

7. A power tool comprising:
a motor;
a rotatable spindle driven by the motor;
a first bit held by the rotatable spindle; and
a removable chuck configured to hold and drive a second bit and including a locking ring having a locking position in which the removable chuck is locked to the spindle and a release position in which the removable chuck is capable of being removed from the spindle;
wherein the power tool is operable to in a first mode in which the removable chuck is removed and the first bit is exposed whereby the first bit is capable of being used to perform a screwdriving operation;
wherein the power tool is operable in a second mode in which the removable chuck is locked to the spindle and the first bit is covered by the removable chuck, whereby the removable chuck is capable of being driven by the motor;
wherein the power tool is configured to switch between the first mode and the second mode without removal of the first bit from the rotatable spindle;
wherein the removable chuck further includes a connection shaft;
wherein the connection shaft includes at least one groove;
wherein the locking ring includes at least one projection;
wherein the locking ring is biased towards a locked position in which the removable chuck is locked to the rotatable spindle;
wherein the at least one projection is engaged with the at least one groove when the locking ring is in the locked position;
wherein the connection shaft includes a fitting portion which has a generally cylindrical outer surface with a longitudinally extending flat surface on the cylindrical outer surface;
wherein the fitting portion is fit in a chuck body opening;
wherein, in the second mode, the locking ring moves away from the motor to move the locking ring from the locking position to the release position;
wherein the rotatable spindle includes a recess;
wherein the removable chuck further includes a lock member; and
wherein the lock member is held in the recess by the at least one projection when the locking ring is in the locked position.

8. The power tool of claim 7, wherein the locking ring is movable in an axial direction along an axis of the chuck.

9. The power tool of claim 7, wherein the connection shaft includes a central opening.

10. The power tool of claim 9, wherein the rotatable spindle fits into the central opening.

11. A power tool, comprising:
a motor;
a spindle rotatably driven by the motor, the spindle including a recess;
a screwdriver bit held by the spindle; and
a chuck removably secured to the spindle, the chuck including a lock member and a locking collar;
wherein the locking collar includes a locking position in which the locking collar biases the lock member into the recess to retain the chuck on the spindle;
wherein the locking collar includes a release position in which the lock member is able to exit the recess and the chuck is able to be removed from the spindle by a user;
wherein the locking collar moves axially away from the motor to move from the locking position to the release position; and
wherein the locking collar is biased towards the locking position;
wherein the removable chuck further includes a connection shaft;
wherein the removable chuck includes a chuck body with a chuck body opening;
wherein the chuck body opening is generally cylindrical with a flat portion;
wherein the connection shaft includes a fitting portion which has a generally cylindrical circumferential outer surface with a flat surface on the circumferential outer surface so as to correspond with the chuck body opening;
wherein the flat surface extends longitudinally on the cylindrical outer surface; and
wherein the fitting portion is fit in the chuck body opening.

12. The power tool of claim 11, wherein the chuck further comprises a bit receiving opening in which the screwdriver bit held by the spindle is received when the chuck is retained on the spindle.

13. The power tool of claim 11, wherein the chuck further includes a plurality of jaws configured to hold and drive a second bit.

14. The power tool of claim 11, wherein the connection shaft holds the lock member.

15. The power tool of claim 11, wherein the lock member comprises a ball bearing.

* * * * *